(12) United States Patent
Oh et al.

(10) Patent No.: US 6,280,850 B1
(45) Date of Patent: Aug. 28, 2001

(54) OPTICAL FIBER PREFORM HAVING OH BARRIER AND MANUFACTURING METHOD THEREOF

(75) Inventors: Sung-koog Oh; Man-seok Seo; Mun-hyun Do; Jin-seong Yang, all of Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/344,368

(22) Filed: Jun. 25, 1999

(30) Foreign Application Priority Data

Jun. 25, 1998 (KR) .............................. 1998-24159
Jan. 28, 1999 (KR) .............................. 1999-2696

(51) Int. Cl.[7] .............................. G02B 6/18; G02B 6/22
(52) U.S. Cl. .................. 428/428; 428/34.6; 428/212; 385/124; 385/126; 385/127; 359/341
(58) Field of Search .............................. 65/385, 412, 415, 65/417, 418, 419, 428; 385/123, 124, 126, 127, 128; 428/34.4, 34.6, 34.5, 212, 428, 426; 359/341

(56) References Cited

U.S. PATENT DOCUMENTS

| | | | |
|---|---|---|---|
| 3,711,262 | * | 1/1973 | Keck et al. . |
| 4,114,980 | * | 9/1978 | Asam et al. . |
| 4,184,859 | * | 1/1980 | Maklad . |
| 4,227,806 | * | 10/1980 | Watkins . |
| 4,230,472 | * | 10/1980 | Schultz . |
| 4,257,797 | * | 3/1981 | Andrejco et al. . |
| 4,385,802 | * | 5/1983 | Blaszyk et al. . |
| 4,515,612 | * | 5/1985 | Burrus et al. . |
| 4,909,816 | * | 3/1990 | MacChesney et al. . |
| 5,106,402 | * | 4/1992 | Geittner et al. . |
| 5,491,581 | * | 2/1996 | Roba . |

FOREIGN PATENT DOCUMENTS

| | | |
|---|---|---|
| 59-3035 | 1/1984 | (JP) . |
| Hei 4-331905 | 11/1992 | (JP) . |

* cited by examiner

*Primary Examiner*—Deborah Jones
*Assistant Examiner*—Jennifer McNeil
(74) *Attorney, Agent, or Firm*—Robert E. Bushnell, Esq.

(57) ABSTRACT

An optical fiber preform having a substrate tube, a cladding layer and a core layer further includes a first barrier layer deposited by a material having a low OH diffusion coefficient between the substrate tube and the cladding layer, wherein the first barrier layer is for substantially preventing OH contained in the substrate tube from being diffused into the cladding layer. The optical fiber preform further includes a second barrier layer formed by depositing a material having a low OH diffusion coefficient between the cladding layer and core layer, for substantially preventing OH which has been diffused into the cladding layer from the substrate tube from being diffused further into the core layer. Outer and inner OH barriers containing no $P_2O_5$ are deposited between the substrate tube and the cladding layer and between the cladding layer and the core layer in a deposition process, such that OH can be effectively prevented from being diffused from the substrate tube to the core layer in a core deposition process, a collapsing process or a closing process.

16 Claims, 4 Drawing Sheets

OPTICAL FIBER PREFORM HAVING OH BARRIER AND MANUFACTURING METHOD THEREOF

CLAIM OF PRIORITY

This application makes reference to, incorporates the same herein, and claims all benefits accruing under 35 U.S.C. §119 from an application entitled OPTICAL FIBER PREFORM HAVING OH BARRIER AND MANUFACTURING METHOD THEREOF earlier filed in the Korean Industrial Property Office on Jun. 25, 1998, and there duly assigned Serial No. 98-24159, and an application entitled OPTICAL FIBER PREFORM HAVING OHBARRIER AND MANUFACTURING METHOD THEREOF earlier filed in the Korean Industrial Property Office on Jan. 28, 1999 and there duly assigned Serial No. 99-2696 by that Office.

BACKGROUND OF THE INVENTION

1. Field of the Invention

The present invention relates to the field of optical fibers and optical fiber manufacturing, and more particularly to optical fiber preforms which minimizing the diffusion of OH from the substrate tube to the core of an optical fiber.

2. Description of the Related Art

A single mode optical fiber is made by depositing a cladding layer and a core layer. In a DC-SM (depressed cladding-single mode) type, a cladding layer is deposited by doping $SiO_2$ with $P_2O_5$, $GeO_2$, and F to lower the deposition temperature and the refractive index, a core layer for transmitting light is deposited by doping $SiO^2$ with $GeO_2$ to increase the refractive index, and then an optical fiber preform is manufactured through a collapsing and closing process.

In a process for manufacturing an optical fiber preform using modified chemical vapor deposition (MCVD), self-collapse of a substrate tube occurs during deposition as the deposition layer becomes thicker, resulting in an increase in the thickness of the tube. Also, a high temperature burner is required to sinter and consolidate a thick deposition layer, and the time for the collapsing and closing process becomes longer, so that a substrate tube becomes exposed to a high temperature over a long period of time.

In this process, when a very small amount of water ($H_2O$) (generally about several ppm) contained in the substrate tube diffuses into the deposition layer, diffused water is combined with $P_2O_5$ or $SiO_2$ deposited in the cladding region, thus forming P—O—H or Ge—O—H bonds. OH which diffuses to the core region is combined with $SiO_2$ or $GeO_2$ deposited in the core layer, thus forming Si—O—H or Ge—O—H bonds while dissolving Si—O or Ge—O bonding. O—H or P—O—H bonds formed in the combination with water in each deposition region as described above result in additional optical loss due to absorption bands at specific wavelength regions. In the case of a single mode optical fiber, wavelength bands in which serious optical loss occurs are the 124 $\mu$m–1.385 $\mu$m band due to the O—H bond combination, and the 1.2–1.8 $\mu$m band due to the P—O—H bond combination. When OH is diffused into the core region, it forms a non-bridging oxygen (NBO), and the structural homogeneity of glass material of the core layer is thus locally deteriorated, which causes density fluctuation of the core layer. Consequently, scattering loss is increased.

The inside and outside diameters of a tube contract with an increase in the thickness of the deposition layer during sintering performed simultaneously with deposition, so that it is difficult to obtain an appropriate diameter ratio (that is, cladding diameter/core diameter=D/d). Therefore, a distance sufficient to prevent diffusion of OH cannot be secured, thus greatly increasing loss due to OH.

In the prior art, a method of thickening the cladding layer is used to prevent OH from diffusing from the substrate tube to the core layer. However, when a large-aperture preform is manufactured by this method, contraction of the tube makes it difficult to secure an appropriate diameter ratio, and a burner of a higher temperature is required during deposition of the core layer since the efficiency of transmitting heat to a core layer is degraded due to an increase in the thickness of the tube layer. Thus, the tube is exposed to high temperature for a long time, thus increasing loss due to OH.

SUMMARY OF THE INVENTION

It is therefore an object of the present invention to provide an improved optical fiber preform and method of manufacturing the preform.

It is also an object of the present invention to provide an optical fiber preform with lower optical loss due to OH and POH absorption bands.

It is a further object of the present invention to provide an optical fiber preform with lower scattering loss.

It is a yet further object of the present invention to provide an optical fiber preform which avoids the problem of diffusion of OH to the core.

It is a still further object of the invention to provide an optical fiber preform which allows easier control over the cladding/core diameter ratio.

To achieve the above objectives, the present invention provides an optical fiber preform capable of effectively reducing loss due to OH while lowering the diameter ratio by forming a barrier layer for blocking or remarkably alleviating diffusion of OH between a substrate tube and a core layer in order to prevent OH from diffusing from the substrate tube into the core layer. The present invention also provides a method of manufacturing an optical fiber preform having an OH barrier.

Accordingly, to achieve the objectives, there is provided an optical fiber preform having a substrate tube, a cladding layer and a core layer, the optical fiber preform further including a first barrier layer deposited by a material having a low OH diffusion coefficient between the substrate tube and the cladding layer, wherein the first barrier layer is for substantially preventing OH contained in the substrate tube from being diffused into the cladding layer.

It is preferable that the optical fiber preform further comprises a second barrier layer formed by depositing a material having a low OH diffusion coefficient between the cladding layer and core layer, for substantially preventing OH which has been diffused into the cladding layer from the substrate tube from being diffused further into the core layer.

There is also provided another optical fiber preform having a substrate tube, a cladding layer and a core layer, the optical fiber preform further comprising a first barrier layer deposited by a material having a low OH diffusion coefficient between the substrate tube and the cladding layer, wherein the first barrier layer is for substantially preventing OH contained in the substrate tube from being diffused into the cladding layer, wherein the refractive index of the core layer is greater than the refractive index of the cladding layer and gradually increases in the direction from the outside of the core layer to the center of the core layer.

It is preferable that this optical fiber preform further comprises a second barrier layer deposited by a material having a low OH diffusion coefficient between the cladding layer and core layer, wherein the second barrier layer is for substantially preventing OH diffused into the cladding layer from being diffused further into the core layer.

To achieve the second objective, there is provided a method of manufacturing an optical fiber preform having a substrate tube, a cladding layer and a core layer, the method comprising the steps of: forming a first barrier layer by depositing a material having a low OH diffusion coefficient; forming a cladding layer by doping a material suitable for lowering a process temperature and increasing deposition efficiency; and forming a core layer being a region through which an optical signal is transmitted.

It is preferable that a second barrier layer is further formed by depositing a material having a low OH diffusion coefficient, before the core layer is formed after the cladding layer is formed. Also, it is preferable that the core layer is formed so that the refractive index gradually increases in is the direction from the outside to the center of the core layer.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 1:
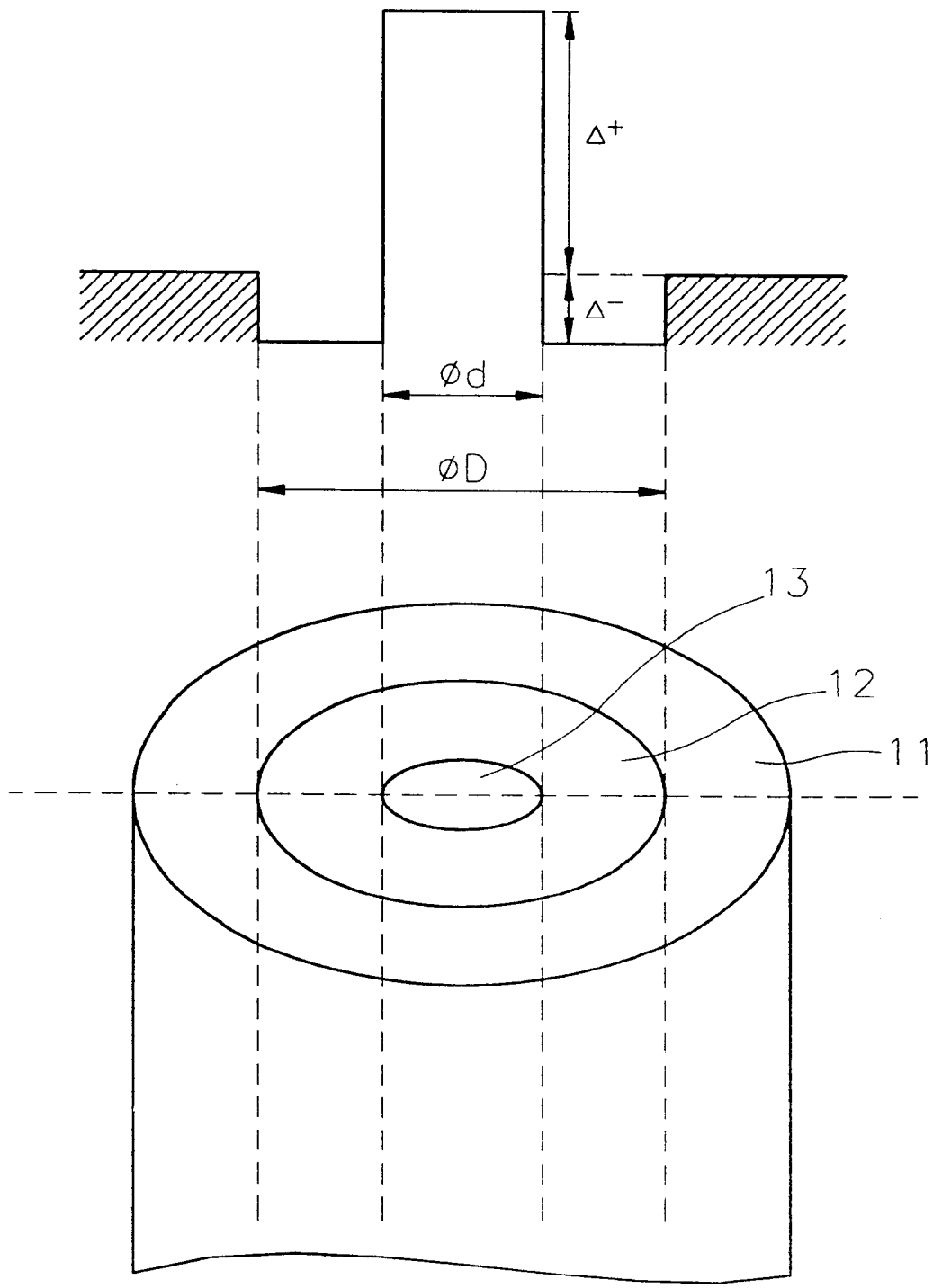
FIG. 1 is a view illustrating a general single mode optical fiber.

Preferred embodiments of the present invention will now be described in more detail with reference to the attached drawings. Referring to FIG. 1 showing a general depressed cladding-single mode (DC-SM) optical fiber, reference numeral 11 denotes a substrate tube, reference numeral 12 denotes a cladding layer, and reference numeral 13 denotes a core layer. Also, $\Delta^+$ represents the refractive index of the core layer and $\Delta^-$ represents the refractive index of the cladding layer, relative to the refractive index of the substrate tube, respectively. Also, $\Phi d$ represents the diameter of the core layer, and $\Phi D$ represents the diameter of the cladding layer.

$P_2O_5$ is deposited to form the cladding layer 12. $P_2O_5$ has a relatively low melting point of about 570° C., so when it is used together with a different source material, the process temperature can be lowered and deposition efficiency can be increased. On the other hand, since the $P_2O_5$ doped on the cladding layer 12 has a large hygroscopicity, it acts as an OH bridge for transmitting OH contained in the substrate tube 11 to the core layer 13. Therefore, loss due to OH in the core layer 13 is increased.

Figure 2:
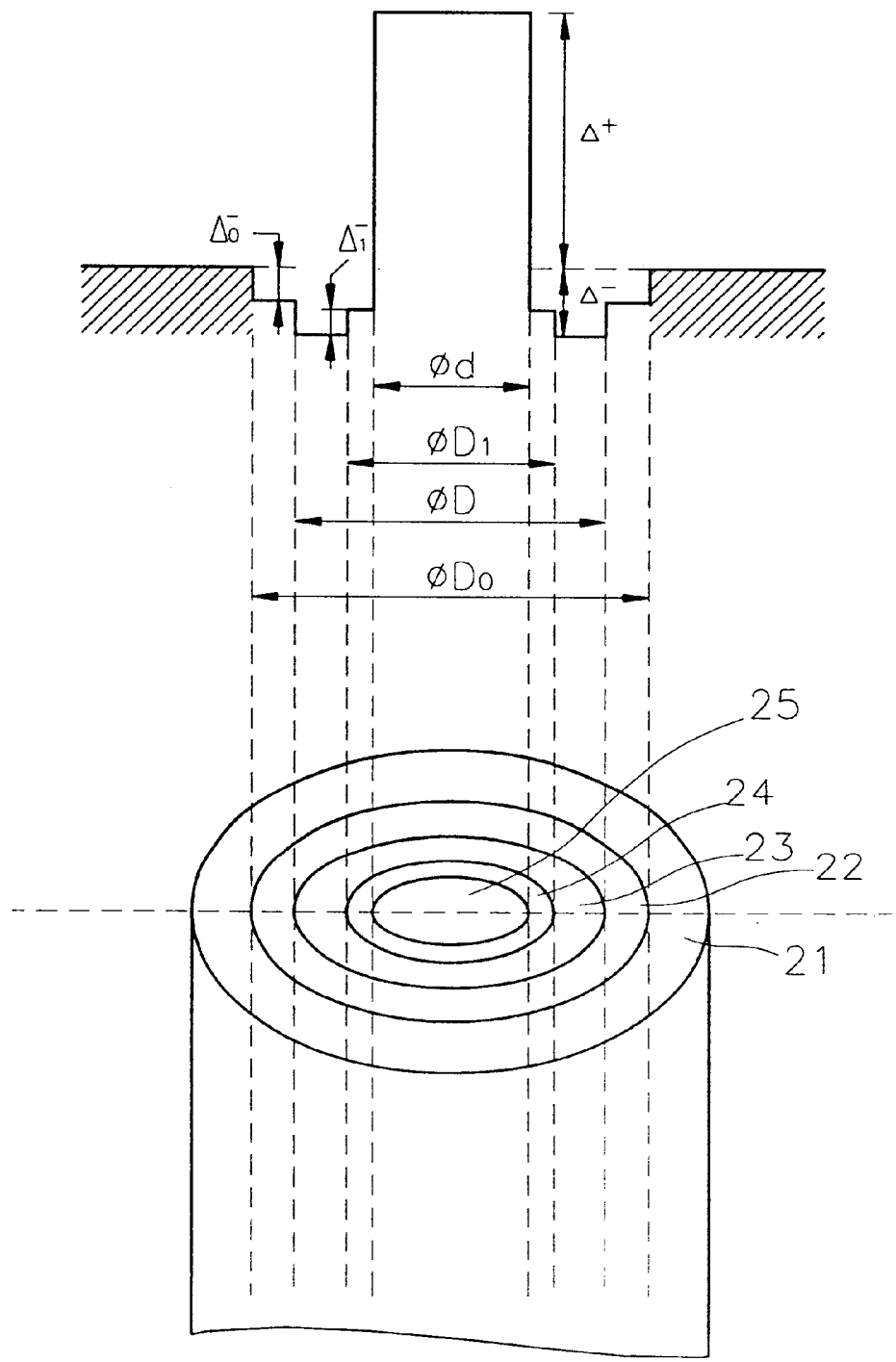
FIG. 2 is a view illustrating a single mode optical fiber according to the present invention.

FIG. 2 is a view illustrating a single mode optical fiber according to the present invention. In FIG. 2, reference numeral 21 denotes a substrate tube, reference numeral 22 denotes a first barrier layer (outer cladding layer), reference numeral 23 denotes a middle cladding layer, reference numeral 24 denotes a second barrier layer (inner cladding layer), and reference numeral 25 denotes a core layer. Also, $\Delta^+$ represents the refractive index of the core layer 25 relative to that of the substrate tube 21, and $\Delta^-$ represents the relative refractive index of the middle cladding layer 23 relative to substrate tube 21. $\Delta_\epsilon^-$ represents the refractive index of the first barrier layer 22, and $\Delta_\cap^-$ represents the refractive index of the second barrier layer 24, each measured relative to the refractive index of the middle barrier layer 23. $\phi d$ represents the diameter of the core layer 25, $\phi D_1$ represents the diameter of the second barrier layer 24, $\phi D$ represents the diameter of the middle cladding layer 23, and $\phi D_0$ represents the diameter of the first barrier layer 22.

As described above, the cladding layer of the optical fiber preform according to the present invention is comprised of three layers each having a different chemical composition rate. In other words, the cladding layer is comprised of the first barrier layer (outer cladding layer) 22, the middle cladding layer 23, and the second barrier layer (inner cladding layer) 24.

The first barrier layer (outer cladding layer) 22 is positioned between the substrate tube 21 having a large OH concentration and the middle cladding layer 23 containing the OH carrier $P_2O_5$, and prevents OH contained in the substrate tube 21 from being diffused into the middle cladding layer 23. The second barrier layer (inner cladding layer) 24 is positioned between the middle cladding layer 23 and the core layer 25, and prevents OH diffused from the substrate tube 21 into the middle cladding layer 23 in spite of the first barrier layer 22 from further penetrating into the core layer 25. The first and second barrier layers 22 and 24 do not contain $P_2O_5$ which acts as an OH bridge, the refractive indices of these layers are controlled by the concentrations of $SiO_2$, $GeO_2$, and F, and the thicknesses of the layers are appropriately controlled according to the overall thickness of the cladding layer. Alternatively, only the first barrier layer 22 can be interposed between the substrate tube 21 having a large concentration of OH and the middle cladding layer 23, or only the second barrier layer 24 can be interposed between the middle cladding layer 23 and the core layer 25.

Referring to the refractive index characteristics of the optical fiber preform, the refractive index of the core layer 25 is greater than that of the cladding layers 22, 23 and 24. Thus, the refractive index of each of the outer and inner cladding layers 22 and 24 is controlled to be the same as or similar to the refractive index of the middle cladding layer 23. Also, the refractive indices of these three layers can be controlled to be the same.

In general, the concentration of OH in the deposition layer is about 1/1000 or less of the concentration of OH in the substrate tube. However, the cladding layer is deposited by doping $P_2O_5$ in order to lower the process temperature in the cladding deposition process. Here, the $P_2O_5$ has a large hygroscopicity. Accordingly, the $P_2O_5$ deposited in the cladding layer acts as a bridge for transmitting OH from the substrate tube to the core layer, thus increasing loss due to OH in the core layer. Hence, in the present invention, an OH barrier doped with materials having low OH diffusion coefficients is formed between the substrate tube having a large concentration of OH and the cladding layer containing the OH carrier $P_2O_5$, or/and between the cladding layer and the core layer. The thus-formed OH barrier can prevent the diffusion of OH from the substrate tube 21 to the core layer 25.

Figure 3:
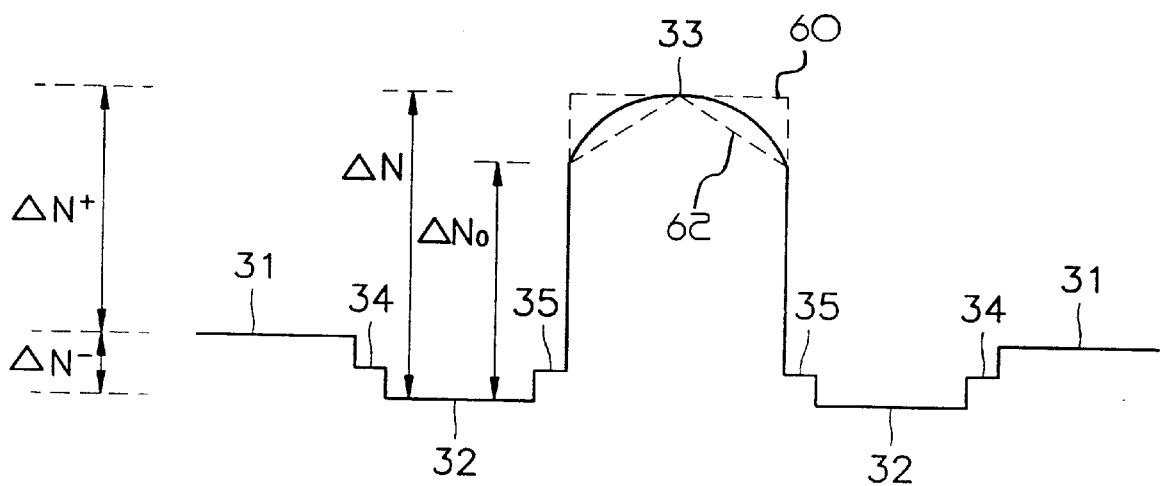
FIG. 3 is a view illustrating another single mode optical fiber according to the present invention.

FIG. 3 is a view illustrating another embodiment of a single mode optical fiber according to the present invention.

In FIG. 3, reference numeral 31 denotes the refractive index of a substrate tube, reference numeral 34 denotes that of a first barrier layer (outer cladding layer), reference numeral 32 denotes that of a middle cladding layer, reference numeral 35 denotes that of a second barrier layer (inner cladding layer), and reference numeral 33 denotes that of a core layer. Also, $\Delta N^+$ represents the refractive index of the core layer 33, and $\Delta N^-$ represents the refractive index of the middle cladding layer 32, which are relative indices to that of the substrate tube 31.

As described above, the cladding layer of the optical fiber preform according to the present invention is comprised of three layers each having a different chemical composition rate. In other words, the cladding layer is comprised of the first barrier layer (outer cladding layer) 34, the middle cladding layer 32, and the second barrier layer (inner cladding layer) 35.

The first barrier layer (outer cladding layer) 34 is positioned between the substrate tube 31 having a large OH concentration and the middle cladding layer 32 containing the OH carrier $P_2O_5$ and prevents OH contained in the substrate tube 31 from being diffused into the middle cladding layer 32. The second barrier layer (inner cladding layer) 35 is positioned between the middle cladding layer 32 and the core layer 33, and prevents OH diffused from the substrate tube 31 into the middle cladding layer 32 or OH resulting from water contained in a chemical material during deposition of the middle cladding layer 32, from penetrating into the core layer 33 which is an optical waveguiding region. The refractive index of each of the outer and inner cladding layers 34 and 35 is controlled to be the same as or similar to the refractive index of the middle cladding layer 32, and not to be greater than the refractive index of the substrate tube 31 or core layer 33.

The amount of OH contained in the substrate tube is relatively high compared to that of silica for deposition. Silica is the most stable deposition chemical material against an OH component in structure and can effectively block the diffusion of OH at a high temperature. Hence, the first and second barrier layers 34 and 35 do not contain $P_2O_5$ acting as an OH bridge, the refractive index of the cladding is controlled using $SiO_2$, Ge, or F, and the thicknesses of these barrier layers are appropriately controlled according to the overall thickness of the cladding layer.

Referring to the refractive index characteristics of the optical fiber preform, the refractive index of the core layer 33 is greater than that of the cladding layers 32, 34 and 35, and the refractive index of the core layer 33 increases at a constant rate toward the center of the core layer as shown in reference numeral 62, as compared to refractive index profile 60 as seen in FIG. 2. Thermal stress due to quick freezing is generated when an optical fiber is drawn out from the preform at high speed. Accordingly, the refractive index of the core layer 33 gradually increases from the refractive index $\Delta N_0$ of the boundary toward the center thereof, thereby finally making the refractive index $\Delta N$ at the center the greatest. By doing this, the optical loss of the optical fiber due to thermal stress, and degradation of the mechanical characteristics of the optical fiber can be prevented, and thus an optical fiber having a low loss and a low diameter ratio can be drawn out at high speed. For example, it is preferable that the refractive index of the outermost portion of the core layer is 75 to 99% of that of the center of the core layer.

Figure 4A:
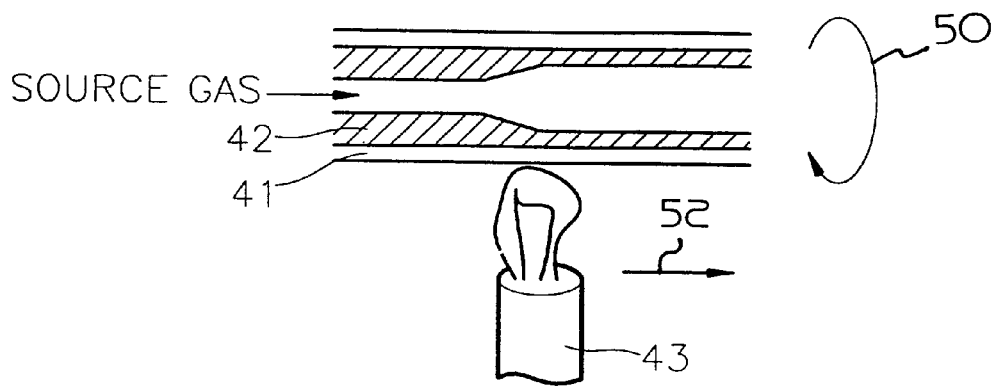
FIGS. 4A, 4B and 4C are views illustrating a method of manufacturing a signal mode optical fiber according to the present invention using a modified chemical vapor deposition (MCVD) method.
Figure 4B:
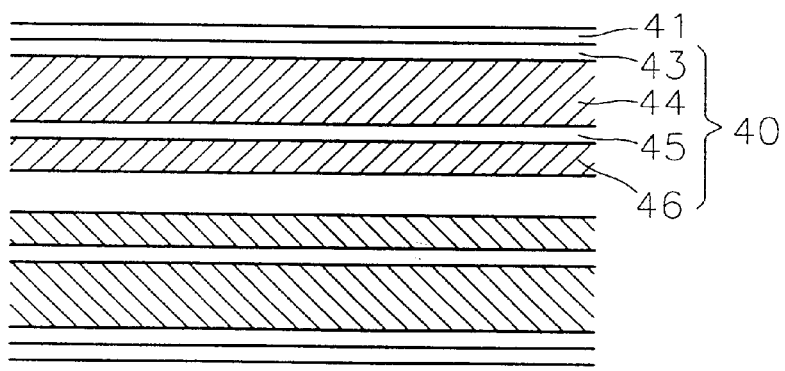
Figure 4C:
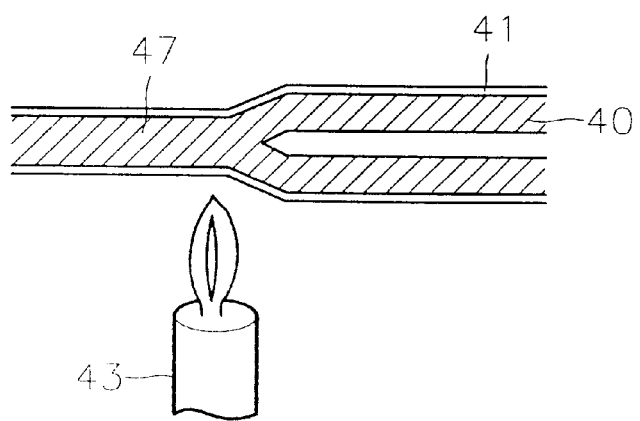

FIGS. 4A, 4B and 4C are views illustrating a method of manufacturing the single mode optical fiber according to the present invention shown in FIG. 2 or 3 using a modified chemical vapor deposition (MCVD) method. In the MCVD method, high purity carrier gases such as $SiCl_4$, $GeCl_4$, $POCl_3$, or $BCl_3$ are introduced together with oxygen into a substrate tube 41 made of glass, and heat is then applied to the substrate tube 41 by a heating means 43, whereby soot, an oxidized deposit, is formed on the inside of the substrate tube by thermal oxidation, in FIG. 4A. Here, the concentration of the source gas is accurately controlled by a computer to adjust the refractive index, thereby depositing a cladding layer/core layer 42. The heating means 43 applies heat to the substrate tube 41 which rotates in the direction indicated by rotating arrow 50, while the heating means moves in the direction indicated by straight arrow 52. The source gases to be deposited are introduced into the substrate tube 41 through an inlet connected to a source material storage unit. A mixing valve and a blocking valve measure the flow of the source materials introduced into the substrate tube and perform adjustments necessary for mixture of the source materials.

In a process for depositing a cladding layer in the present invention, first, an outer cladding layer (a first barrier) is formed by depositing a material having a low OH diffusion coefficient excluding an OH carrier material such as $P_2O_5$ having a large hygroscopicity. Another material suitable for lowering the process temperature and increasing deposition efficiency is doped into $SiO_2$ and the mixture is deposited, thereby forming a middle cladding layer. A material having a low OH diffusion coefficient is deposited excluding an OH carrier material such as $P_2O_5$, thereby forming an inner cladding layer (a second barrier). A core layer, a region where an optical signal is transmitted, is then formed. Therefore, the mixing of source gases introduced into the substrate tube 41 is different for each deposition layer, and this mixing can be accomplished by appropriately controlling the mixing valve and the blocking valve.

In a process for depositing the core layer, the core layer is deposited so that the refractive index is constant from the outside to the center thereof, or so that the refractive index gradually increases in the direction from the outside to the center thereof.

FIG. 4B shows a cladding layer/core layer 40 deposited within the substrate tube 41. In FIG. 4B, reference numeral 43 denotes an outer cladding layer, reference numeral 44 denotes a middle cladding layer, reference numeral 45 denotes an inner cladding layer, and reference numeral 46 denotes a core layer.

Referring to FIG. 4C, the deposited layers as shown in FIG. 4B are collapsed and closed by applying heat to the substrate tube 41, on which the cladding layer/core layer 40 has been deposited, using the heating means 43, thereby forming an optical fiber preform 47. In a deposition process, the outer and inner OH barriers 43 and 45, which have the middle cladding layer 44 between them and do not contain $P_2O_5$ acting as an OH bridge, are deposited, thereby effectively preventing OH from being diffused from the substrate tube 41 into the core layer 46 during a core deposition process, a collapsing process or a closing process. Accordingly, the loss due to an OH absorption band in the core layer can be minimized while an appropriate diameter ratio (D/d) is maintained. Also, the diameter ratio can be made small, and thus the frequency of deposition can be reduced, thereby shortening the processing time. Here, it is preferable that a ratio (D/d) of the diameter (D) of the middle cladding layer to the diameter (d) of the core layer is 1.1 to 3.0.

Meanwhile, in a sintering process performed simultaneously with deposition, self-collapse due to internal surface tension occurs in a process for sintering and consolidating soot particles. A buffer layer having a similar viscosity to the substrate tube exists between the substrate tube having a high viscosity and the cladding layer having a relatively low viscosity, such that the deterrent power of the tube is improved, and contraction of the tube can thus be reduced.

When an optical fiber preform is manufactured using the MCVD method, the total processing time becomes shorter as the diameter ratio becomes smaller, and a small diameter ratio is very favorable to the manufacture of a preform having a large aperture. In the prior art, when a diameter ratio becomes small, the OH loss is suddenly increased, thus deteriorating the quality of an optical fiber. Thus, it is commonly known that the diameter ratio is about 3.0. However, according to the present invention, even when the diameter ratio is reduced to less than 3.0, for example, to about 1.1 to 3.0, the OH absorption loss can be reduced, and loss due to thermal stress can also be minimized.

In the present invention, according to optical fiber preforms having an OH barrier and a manufacturing method thereof as described above, outer and inner OH barriers containing no $P_2O_5$ are deposited between a substrate tube and a cladding layer and between the cladding layer and a core layer in a deposition process, such that OH is effectively prevented from being diffused from the substrate tube to the core layer in a core deposition process, a collapsing process or a closing process. Hence, loss due to OH in the core layer can be prevented. Also, the core layer is formed to increase its refractive index in the direction from the outside to the center, such that degradation of characteristics due to high-speed drawing-out of an optical fiber from the preform can be prevented.

What is claimed is:

1. An optical fiber preform, comprising:
    a substrate tube;
    an outer cladding layer formed of a $P_2O_5$-free material deposited on the inside of the substrate tube, for preventing diffusion of OH;
    a middle cladding layer deposited on the inside of the outer cladding layer;
    an inner cladding layer formed of a $P_2O_5$-free material deposited on the inside of the outer cladding layer, for preventing diffusion of OH; and
    a core layer formed on the inside of the inner cladding layer, said core layer having a value of refractive index greater than those of the outer cladding layer, middle cladding layer and inner cladding layer.

2. The optical fiber preform of claim 1, further comprising:
    said outer cladding layer comprising $SiO_2$ and further comprising $GeO_2$ or F.

3. The optical fiber preform of claim 1, said outer cladding layer consisting essentially of $GeO_2$, $SiO_2$ and F.

4. The optical fiber preform of claim 1, further comprising:
    said inner cladding layer comprising $SiO_2$ and further comprising $GeO_2$ or F.

5. The optical fiber preform of claim 1, said inner cladding layer consisting essentially of $GeO_2$, $SiO_2$ and F.

6. The optical fiber preform of claim 1, further comprising:
    said outer cladding layer, middle cladding layer and inner cladding layer each having similar values of refractive index, and the values of refractive index for each of the outer cladding layer, middle cladding layer and inner cladding layer being less than that of the substrate tube.

7. The optical fiber preform of claim 1, further comprising:
    said outer cladding layer, middle cladding layer and inner cladding layer each having the same value of refractive index, and the values of refractive index for each of the outer cladding layer, middle cladding layer and inner cladding layer being less than that of the substrate tube.

8. The optical fiber preform of claim 1, further comprising:
    said outer cladding layer and inner cladding layer each having similar values of refractive index, and the values of refractive index for each of the outer cladding layer and inner cladding being greater than that of the middle cladding layer and less than that of the substrate tube.

9. The optical fiber preform of claim 1, further comprising:
    the refractive index value of said core increasing gradually from the outer portion of the core layer toward the center of the core layer.

10. The optical fiber preform of claim 9, further comprising:
    the rate of increase of refractive index with the distance from the outer portion of the core layer to the center of the core layer being greater toward the outer portion of the core layer.

11. The optical fiber preform of claim 9, further comprising:
    the value of refractive index at the outer portion of the core being in the range of approximately 75 to 99% of the value of refractive index at the center of the core.

12. The optical fiber preform of claim 1, further comprising:
    the ratio of the diameter of the middle cladding layer to the diameter of the core layer being in the range of approximately 1.1 to 3.0.

13. An optical fiber preform having a substrate tube, a cladding layer and a core layer, the optical fiber preform further comprising a first barrier layer formed of a material having a low OH diffusion coefficient between the substrate tube and the cladding layer, wherein the first barrier layer is for substantially preventing OH contained in the substrate tube from being diffused into the cladding layer; and further comprising:
    a second barrier layer formed of a material having a low OH diffusion coefficient between the cladding layer and core layer, for substantially preventing OH which has been diffused into the cladding layer from the substrate tube from being diffused further into the core layer.

14. The optical fiber preform of claim 13, wherein the refractive index of the core layer is gradually increased from the outer portion of the core layer toward the center of the core layer.

15. An optical fiber preform having a substrate tube, a cladding layer and a core layer, the optical fiber preform further comprising a first barrier layer formed of a material having a low OH diffusion coefficient between the cladding layer and core layer, for substantially preventing OH which has been diffused into the cladding layer from the substrate tube from being diffused into the core layer, and further comprising:
    a second barrier layer formed of a material having a low OH diffusion coefficient between the substrate tube and the cladding layer, wherein the first barrier layer is for substantially preventing OH contained in the substrate tube from being diffused into the cladding layer.

16. The optical fiber preform of claim 15, wherein the refractive index of the core layer is gradually increased from the outer portion of the core layer toward the center of the core layer.

* * * * *